United States Patent [19]

Duina

[11] Patent Number: 4,929,164

[45] Date of Patent: May 29, 1990

[54] COMPOUND PRESS FOR PIECE MOLDING

[75] Inventor: Gianfranco Duina, Brescia, Italy

[73] Assignee: Norda S.P.A. Via Vallecamonica, Italy

[21] Appl. No.: 259,974

[22] Filed: Oct. 19, 1988

[30] Foreign Application Priority Data

Oct. 22, 1987 [IT] Italy ................................ 22373A/87

[51] Int. Cl.[5] ........................ B28B 13/02; B28B 13/06; B29C 43/34

[52] U.S. Cl. ...................................... 425/145; 72/421; 72/426; 72/422; 269/58; 425/150; 425/397; 425/403.1; 425/422; 425/DIG. 108

[58] Field of Search ............... 425/145, 149, 150, 422, 425/394, 397, 403.1, 406, DIG. 108, 412, 413, 167, 308; 264/40.7; 72/405, 419, 421, 422, 426, 428; 269/56, 58

[56] References Cited

U.S. PATENT DOCUMENTS

| | | | |
|---|---|---|---|
| 4,259,052 | 3/1981 | Imanishi et al. | 425/145 |
| 4,279,561 | 7/1981 | Schneider et al. | 72/419 |
| 4,571,320 | 2/1986 | Walker | 425/403.1 |
| 4,856,395 | 8/1989 | Smith et al. | 425/308 |

FOREIGN PATENT DOCUMENTS

| | | | |
|---|---|---|---|
| 224652 | 6/1987 | European Pat. Off. | 72/405 |
| 2746161 | 4/1979 | Fed. Rep. of Germany | 72/405 |
| 54-11575 | 1/1979 | Japan | 72/421 |
| 58-196126 | 11/1983 | Japan | 72/421 |
| 60-141343 | 7/1985 | Japan | 72/405 |
| 61-9931 | 1/1986 | Japan | 72/405 |
| 2033812A | 5/1980 | United Kingdom | 72/405 |
| 2077957A | 12/1981 | United Kingdom | 425/149 |
| 2118129A | 10/1983 | United Kingdom | 72/419 |

*Primary Examiner*—Jeffery Thurlow
*Assistant Examiner*—Mathieu Vargot

[57] ABSTRACT

Compound press suitable to autonomously perform all operations necessary to mold pieces, including mechanisms to feed the pieces to be molded, and molding of same and to discharge the molded pieces.

1 Claim, 2 Drawing Sheets

COMPOUND PRESS FOR PIECE MOLDING

BACKGROUND OF THE INVENTION

1. Field of the invention

The present invention refers to a compound press for piece molding. More in particular, it refers to a multiple press suitable to autonomously and automatically carry out all operations necessary to mold the pieces.

2. Description of the prior art

As noted, conventional presses for piece molding are provided with a separate feed unit, which sends the pieces, one at a time, in exact position to permit the press to carry out molding correctly.

While performing the required operations correctly, the conventional machines have, however, economic and operating disadvantages. The economic disadvantages mainly derive from the fact that the noted machines need separate means of control and synchronism to drive the feed and press means. Consequently, conventional machines are very expensive as they must provide two separate systems of control and synchronism.

A further disadvantage of conventional machines is that, frequently, synchronism between the feed unit and press is not perfect, causing undesired jamming or stopping of the machine due to the fact that the piece to be molded reaches the press at a feed time different from that required.

SUMMARY OF THE INVENTION

The object of the present invention is to provide, for the moldings of pieces, a press which eliminates all problems of the conventional machines.

According to the present invention, this object is obtained by means of a compound press which also incorporates the feed means of the pieces to be molded.

The characteristics and advantages of the press according to the present invention can be better understood from the following detailed description which refers to a preferred, not limiting form of construction of the present invention, shown in the attached drawings.

BRIEF DESCRIPTION OF THE DRAWINGS

In the figures:

FIG. 1 illustrates in schematic form the structure of a conventional press provides with a separate feed unit, which sends the pieces to the abovementioned press 10 for the molding operation. The press 10 is suitable to carry out only the molding operation and to it is associated a feed unit 12 which feeds the press 10 by means of feed means shown schematically in FIG. 1.

Figure 1:
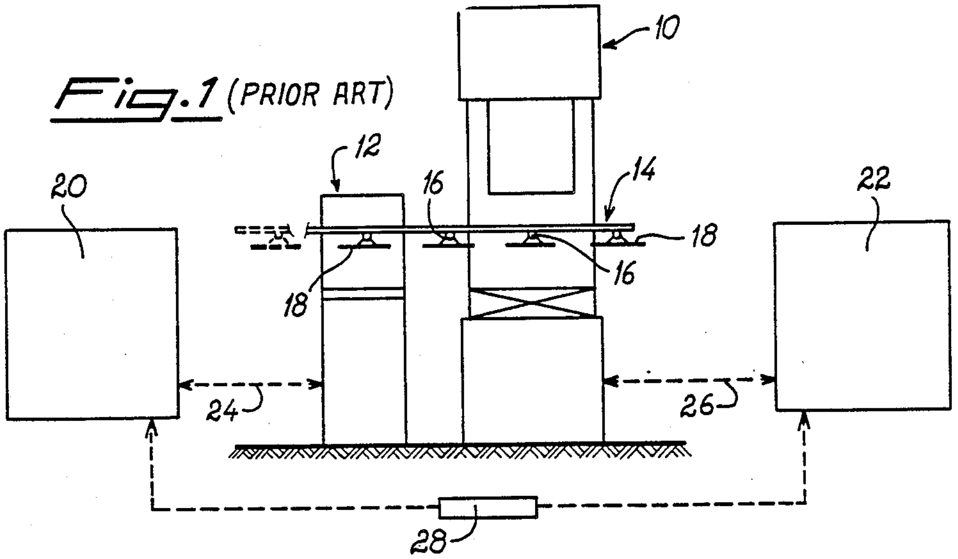
Fig. 1 (PRIOR ART)
FIG. 1 shows the schematic view of a conventional press.

The above means essentially comprises a supporting and moving arm 14, which, by means of grips 16, supports the pieces 18.

The movement of the supporting arm 14 and the relative means of support 16 by the feed unit 12 makes it possible to carry the pieces 18, one at a time, to the press 10 for molding. As can be seen from FIG. 1, the feed unit 12 is provided with a separate command and control device 20, which determines the movement of the feed unit 12.

Similarly, a second separate command and control device 22 determines the movement of the press 10.

The connections between the control and command device 20 and the feed unit 12 and between the command and control device 22 and the press 10 are indicated respectively with 24 and 26 and represented by a double broken arrow. The two control and command devices 20 and 22, of the feed unit 12 and the press 10 respectively, are interconnected by a connection 28, which, in a manner known in the art, synchronizes intervention of the command and control device 20 of the feed unit 12 with control and command device 22 of the press 10.

The structure of the machine as a whole is rather complicated, as it is necessary, preliminarily and frequently also during operation, to synchronize the two control and command devices 20 and 22. The conventional machine is therefore complicated, expensive and difficult to regulate. In these machines, in fact, there are two command and control devices and a device which synchronizes these two devices is required to permit correct feed of the pieces to the press 10.

In other words, the synchronization circuit 28 must operate in such a way that the control and command device 20 positions the pieces 18 correctly, so that the command and control device 22 makes the press 10 act for the molding of same.

It is evident that a similar machine is very expensive, as a high number of devices is required. Furthermore, it is necessary to perfectly synchronize the command device 20 of the feed unit 12 with the command device 22 of the press for which the presence of a further synchronizing device is necessary, which further helps to increase the total cost of the machine.

DESCRIPTION OF THE PREFERRED EMBODIMENTS

Figure 2:
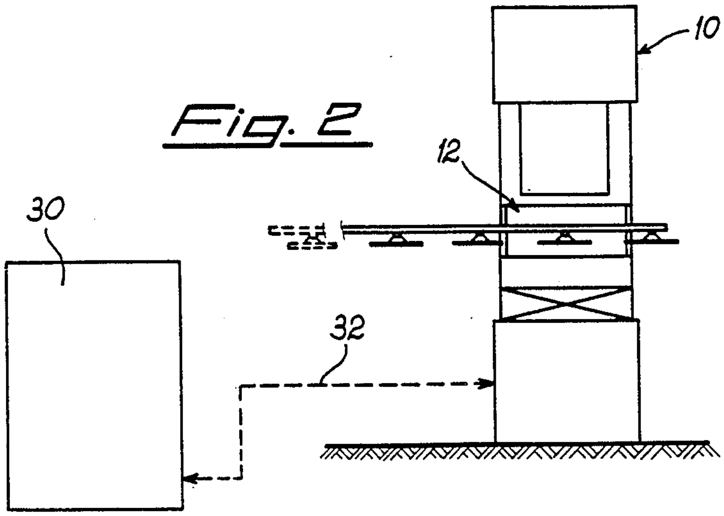
FIG. 2 shows the schematic view of a compound press according to the present invention.

FIG. 2 shows the press according to the present invention, which makes it possible to eliminate all the above problems, as the press in question is provided with and incorporates the abovementioned feed means previously formed by the feed unit 12.

A first examination of FIG. 2 makes evident the constructive simplicity of the press according to the present invention, which, indicated as a whole with 10, incorporates the feed means formed, in the traditional machines, by a separate, autonomous unit, previously indicated with 12.

Again with particular reference to FIG. 2, the press 10 of the present invention provides a single control board 30, which, through a connection 32 connected to same, carries out all necessary operations.

The control board 30 will therefore move the feed means 12 incorporated in the press 10 and drive the latter for molding of the pieces.

The machine according to the invention is therefore extremely simplified compared to conventional machines and the synchronism operation is therefore simplified as it is directed at a single machine, the press 10, so there is no possibility of incorrect positioning of the pieces in this latter.

From the comparative examination of FIGS. 1 and 2, it also results that a control and command device has been eliminated, as, according to the invention, only one is provided, and also a synchronization circuit intervenes on a single machine, while previously it had to coordinate the movement of two separate machines or units.

FIGS. 3 to 6 show, in greater detail, the press according to the present invention in one of the possible solutions. The press of the present invention autonomously feeds, molds and discharges the pieces.

Figure 3:
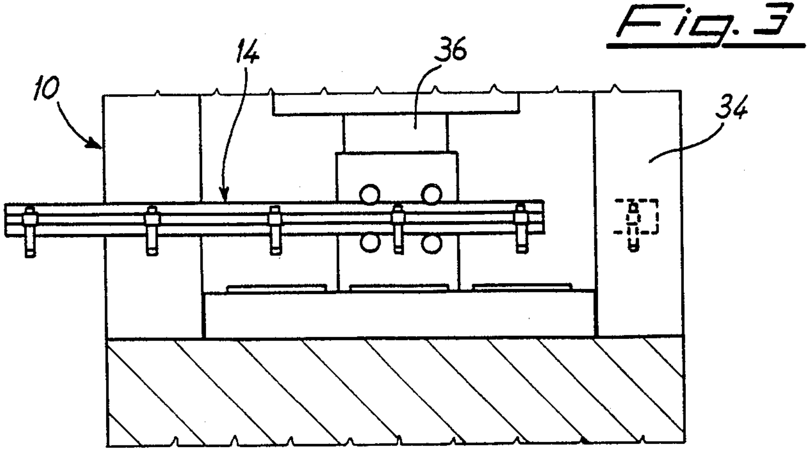
FIG. 3 shows the more detailed front schematic view of a part of the press shown in FIG. 2.
Figure 4:
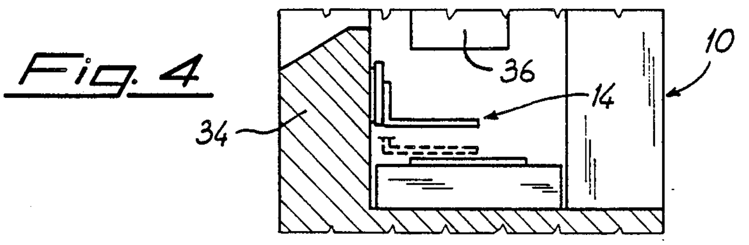
FIG. 4 shows the lateral schematic view of FIG. 3.
Figure 5:
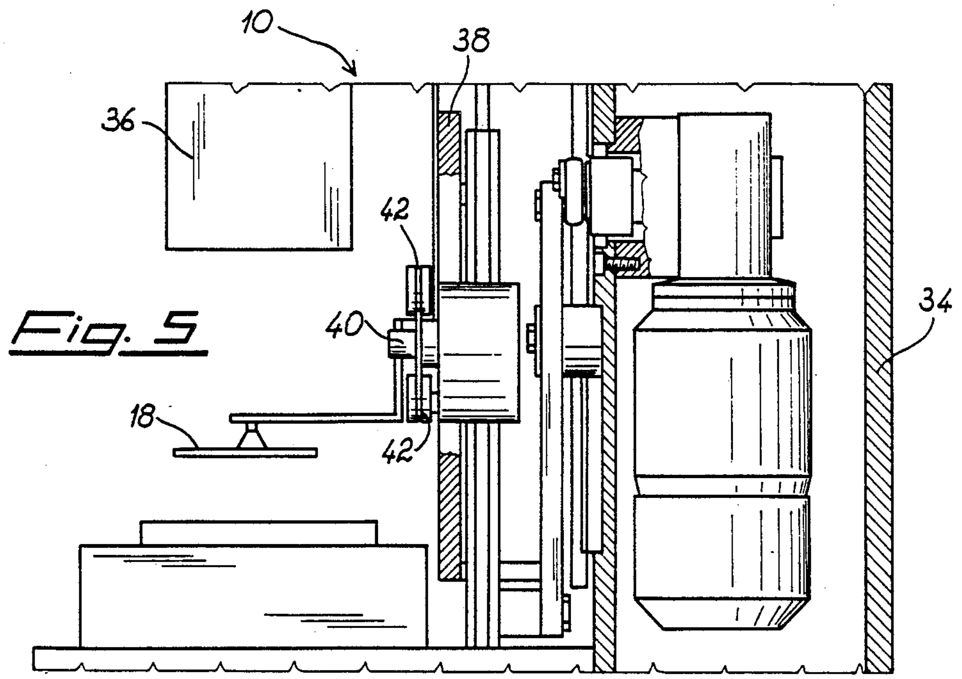
FIG. 5 shows the lateral schematic view of the feed and discharge means of the pieces of the compound press according to the present invention.
Figure 6:
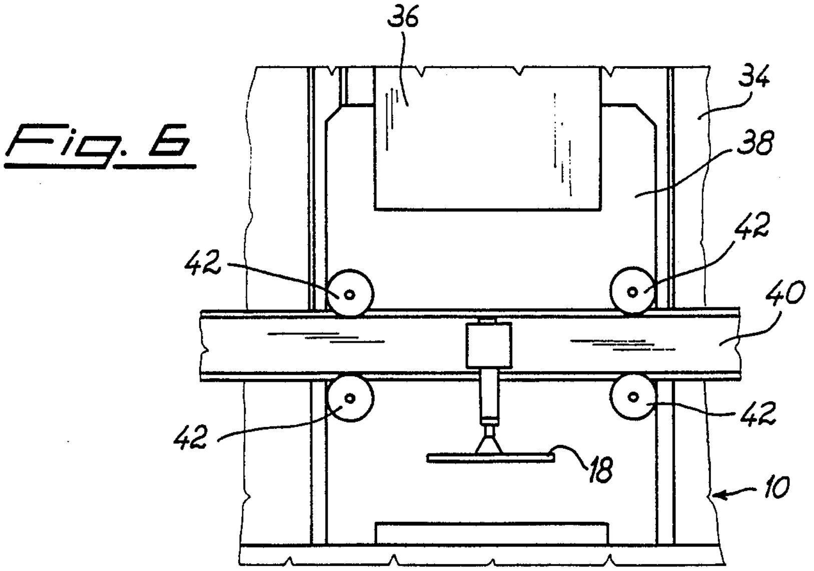
FIG. 6 shows the front schematic view of FIG. 5.

With reference to FIGS. 3 and 4, the frame 34 of the press 10 supports both the molding parts of the press and the means incorporated in the press for the movement of the pieces to be molded.

The press 10 comprises a molding head 36 of known type, which is therefore not described in detail.

The head 36 is provided, in a conventional manner, with means of the die and counterdie type, designed to mold the pieces 18, which are fed to it by the feed means 14 incorporated in the press 10.

The feed means, schematically indicated with 14, withdraw the pieces to be moulded from a feed station (not illustrated) and carry them to the press 10.

The above means comprise a vertical movable carriage 38, which supports, in a freely sliding way in horizontal direction, a feed rod 40 to position the pieces in the operating machine formed by the press 10. The feed rod 40 is provided with grips which support the pieces 18. This rod 40 slides freely on the carriage 38 in such a way that the forward or backward movement of same does not involve horizontal movements of the carriage 38. In this way the pieces will be correctly positioned with respect to the press 10.

The means which support the feed rod 40 are formed by small rollers carried by the movable carriage 38 and placed above and below said rod 40.

The swinging upward and downward movement of the movable carriage 38 is obtained by means of a transmission kinematism of known type of movement which is therefore not described.

After positioning the piece to be molded 18 in the correct position through the horizontal movement of the rod 40, the carriage 38 drops, placing the piece 18 in molding position. After molding, the molded piece is discharged by means of the subsequent horizontal movement of the rod 40, after lifting carriage 38.

The advantages of the compound press according to the present invention are evident.

The press in question, compared to traditional machines, is, in fact, a compact, reliable, highly efficient machine. The substantial advantage obtained by the compound press, according to the present invention, consists of the fact that the separate feed unit of conventional machines has been eliminated.

It is sufficient for this purpose, as mentioned above, to provide a simple feed station which needs no connections or synchronisms with the press; the press autonomously directly withdraws the pieces from the above station and feeds them to molding.

A further advantage consists of the fact that the operator must command the press by means of a single control board with which he controls the entire operation of the press. Operation of the press, having been simplified, can be centralized and automated by an electronic programmer, which eliminates manual operation of the operator, thus making the press completely autonomous.

I claim:

1. A press apparatus for molding work pieces and for discharging the molded work pieces from a press (10) comprising a frame (34) for supporting said press, feeding means (14) for feeding the work pieces one by one to the press, said feeding means being incorporated in said press, said press having molding parts and means for moving said work pieces incorporated in said press, said frame supporting said molding parts and said means for moving said work pieces, a single command and control unit (30), means (32) for connecting said control unit to said press, said feeding means comprising a vertically movable carriage (38), a feed rod (40) to position the pieces in the press, said rod being provided with gripping means and being slidably supported in the horizontal direction by said movable carriage, said feed rod (40) being supported on the movable carriage by means of rollers (42) carried by said carriage and placed above and below said feed rod, and a program control mechanism whereby after each work piece is positioned in the correct position for molding, said carriage is lowered and after the molding is completed, said carriage is raised, each molded piece is discharged and said apparatus operates totally autonomously.

* * * * *